(12) United States Patent
Kunnathur Ragupathi et al.

(10) Patent No.: US 9,875,632 B2
(45) Date of Patent: Jan. 23, 2018

(54) OPTIMIZED SERVICE MODE COOLING

(71) Applicant: Dell Products L.P., Round Rock, TX (US)

(72) Inventors: Dinesh Kunnathur Ragupathi, Round Rock, TX (US); Hasnain Shabbir, Round Rock, TX (US); Stuart A. Berke, Austin, TX (US)

(73) Assignee: Dell Products L.P., Round Rock, TX (US)

(*) Notice: Subject to any disclaimer, the term of this patent is extended or adjusted under 35 U.S.C. 154(b) by 132 days.

(21) Appl. No.: 14/850,150

(22) Filed: Sep. 10, 2015

(65) Prior Publication Data

US 2017/0076575 A1 Mar. 16, 2017

(51) Int. Cl.
| | |
|---|---|
| *G08B 21/02* | (2006.01) |
| *G08B 3/10* | (2006.01) |
| *G08B 5/22* | (2006.01) |
| *G06F 1/32* | (2006.01) |

(52) U.S. Cl.
CPC .......... *G08B 21/02* (2013.01); *G06F 1/3287* (2013.01); *G08B 3/10* (2013.01); *G08B 5/22* (2013.01)

(58) Field of Classification Search
CPC ........ G06F 11/3058; G06F 1/206; G06F 1/20; G08B 21/02
See application file for complete search history.

(56) References Cited

U.S. PATENT DOCUMENTS

| 8,350,711 B2 | 1/2013 | Berke et al. |
| 8,368,547 B2 | 2/2013 | Berke et al. |
| 8,604,933 B2 | 12/2013 | Berke et al. |
| 2009/0100194 A1* | 4/2009 | Bhadri .................. G06F 13/105 709/244 |
| 2011/0090087 A1* | 4/2011 | Berke .................... G08B 21/02 340/584 |
| 2015/0373877 A1* | 12/2015 | Ragupathi .......... H05K 7/20718 361/679.48 |

* cited by examiner

*Primary Examiner* — Hongmin Fan
(74) *Attorney, Agent, or Firm* — Baker Botts L.L.P.

(57) ABSTRACT

A management controller may monitor temperatures of information handling resources in an information handling system and identify abnormalities associated with the information handling resources. When a power down sequence is initiated, the management controller may use any identified abnormalities as well as user input indicating a particular information handling resource for service. The management controller may perform service mode cooling to make the information handling system safe for servicing as soon as possible. The user may be alerted when the temperature conditions indicate safe handling of identified information handling resources. The management controller may also control an electromechanical cover preventing access to the information handling resources.

20 Claims, 4 Drawing Sheets

OPTIMIZED SERVICE MODE COOLING

TECHNICAL FIELD

The present disclosure relates in general to servicing information handling system resources, and more particularly to service mode cooling of information handling resources.

BACKGROUND

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and demands vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

As the capabilities of information handling systems have improved and processing demands have increased, the power demands of information handling systems have increased, including power demands for individual component information handling resources included in information handling systems. Accordingly, an amount of heat produced by certain information handling resources has increased with some components operating at or close to maximum operating temperature limits. The increased temperature resulting from the greater heat poses potential risks such as injuries to a user, especially for users who service or swap out the components when the components may be too hot to safely handle.

Typically, upon a power down of an information handling system, a time delay has been used before allowing a user to access the information handling system and handle the information handling resources for servicing. In some cases, the time delay considers a worst case scenario, such as a time delay until a given information handling resource has reached a safe temperature. However, the time delay is not always accurate because certain factors, such as the temperature of the system as a whole, operation of cooling fans upon a power down sequence, among other factors, may influence the actual temperature at a particular information handling resource. Thus, the time delay may be too short and may cause injuries to system technicians who service the information handling resources. Alternatively, the time delay may be too long and may cause a prolonged downtime or a delay in servicing the information handling system, which is economically undesirable.

SUMMARY

In one aspect, a disclosed system is for service mode cooling of information handling resources. The system may include an information handling system cooled by at least one cooling element. The information handling system may include a plurality of information handling resources, including a first information handling resource and a plurality of sensors thermally coupled to the plurality of information handling resources. The information handling system may further include a controller communicatively coupled to the information handling system. In the system, the controller may be enabled to identify that the first information handling resource indicates service based on at least one of: initiation of a power down sequence, system error logs for the information handling system, and user input from a user. In the system, the controller may further be enabled to control operation of a cooling element to cool the first information handling resource, and receive a first signal indicating a first temperature associated with the first information handling resource. In the system, the controller may also be enabled to determine when the first temperature is within a predetermined temperature range, the predetermined temperature range indicating safety for handling. When the first temperature is within the predetermined temperature range, in the system, the controller may be enabled to output an alert to a user indicating that the first information handling resource is safe for handling.

In any of the disclosed embodiments of the system, the system error logs may indicate an error having a severity level that exceeds a predetermined threshold. In any of the disclosed embodiments of the system, the alert may include at least one of an audible alert and visual alert. In any of the disclosed embodiments of the system, the power down sequence may be specific to the first information handling resource.

In any of the disclosed embodiments, the system may further include an electro-mechanical cover covering at least a portion of the information handling system. In the system, the controller may be further enabled to lock the electro-mechanical cover until the first temperature is within the predetermined temperature range.

In any of the disclosed embodiments of the system, the controller may include a management controller. In any of the disclosed embodiments of the system, the controller may be further enabled to, based on a cooling zone within the information handling system associated with the first information handling resource, identify the cooling element.

In any of the disclosed embodiments, the system may further include a second information handling resource in the plurality of information handling resources, while the controller may further enabled to identify the second information handling resource as being adjacent to the first information handing resource, control operation of the cooling element to cool the first information handling resource and the second information handling resource, receive a second signal indicating a second temperature associated with the second information handling resource, and output the alert to the user indicating that the first information handling resource is safe for handling based on the first temperature and the second temperature.

In another aspect, an information handling system is disclosed. The information handling system may include a plurality of information handling resources, including a first information handling resource and a second information handling resource, including a plurality of sensors thermally coupled to the plurality of information handling resources. The information handling system may further include a controller communicatively coupled to the plurality of information handling resources. In the information handling system, the controller may be enabled to identify that the first information handling resource indicates service based on at least one of: initiation of a power down sequence, system error logs for the information handling system, and user input from a user. In the information handling system, the controller may be further enabled to identify the second information handling resource as being adjacent to the first information handing resource, control operation of a cooling element to cool the first information handling resource and the second information handling resource, and receive a signal indicating a first temperature associated with the first information handling resource and a second temperature associated with the second information handling resource. In the information handling system, the controller may be still further enabled to determine when the first temperature and the second temperature are within a predetermined temperature range, the predetermined temperature range indicating safety for handling, and, when the first temperature and the second temperature are within the predetermined temperature range, output an alert to a user indicating that the first information handling resource is safe for handling.

In any of the disclosed embodiments of the information handling system, the system error logs may indicate an error having a severity level that exceeds a predetermined threshold.

In any of the disclosed embodiments of the information handling system, the controller may include a management controller, and the controller may be further enabled to, based on a cooling zone within the information handling system associated with the first information handling resource, identify the cooling element.

In any of the disclosed embodiments of the information handling system, the cooling element may include a cooling fan, and controlling operation of the cooling element may include controlling at least one of a fan speed and a power consumption of the cooling element. In any of the disclosed embodiments of the information handling system, the power down sequence may be specific to the first information handling resource.

In any of the disclosed embodiments of the information handling system, the controller may be further enabled to report configuration parameters of the information handling system when a power down sequence is detected. In any of the disclosed embodiments of the information handling system, the plurality of information handling resources may include at least one of a processor and a memory device. In any of the disclosed embodiments of the information handling system, the alert may include at least one of an audible alert and a visual alert.

In a further aspect, a disclosed method is for service mode cooling of information handling resources. The method may include identifying a first information handling resource of a plurality of information handling resources that indicates service based on at least one of: initiation of a power down sequence, system error logs for the information handling system, and user input from a user. In the method, the plurality of information handling resources may include a plurality of sensors thermally coupled to the plurality of information handling resources. Based on a cooling zone within the information handling system associated with the first information handling resource, the method may include identifying a cooling element enabled to cool the first information handling resource. The method may also include controlling operation of the cooling element to cool the first information handling resource, receiving a first signal indicating a first temperature associated with the first information handling resource, and determining when the first temperature and the second temperature are within a predetermined temperature range, the predetermined temperature range indicating safety for handling. When the first temperature is within the predetermined temperature range, the method may still further include output an alert to a user indicating that the first information handling resource is safe for handling.

In any of the disclosed embodiments of the method, the system error logs may indicate an error having a severity level that exceeds a predetermined threshold. In any of the disclosed embodiments of the method, controlling operation of the cooling element may include controlling a cooling level of the cooling element. In any of the disclosed embodiments of the method, the system error logs may be collected by an operating system executing on the information handling system. In any of the disclosed embodiments, the method may further include accessing the system error logs by a management controller included in the information handling system.

In any of the disclosed embodiments, the method may further include identifying a second information handling resource of the plurality of information handling resources as being adjacent to the first information handing resource, controlling operation of the cooling element to cool the first information handling resource and the second information handling resource, receiving a second signal indicating a second temperature associated with the second information handling resource, and outputting the alert to the user indicating that the first information handling resource is safe for handling based on the first temperature and the second temperature.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
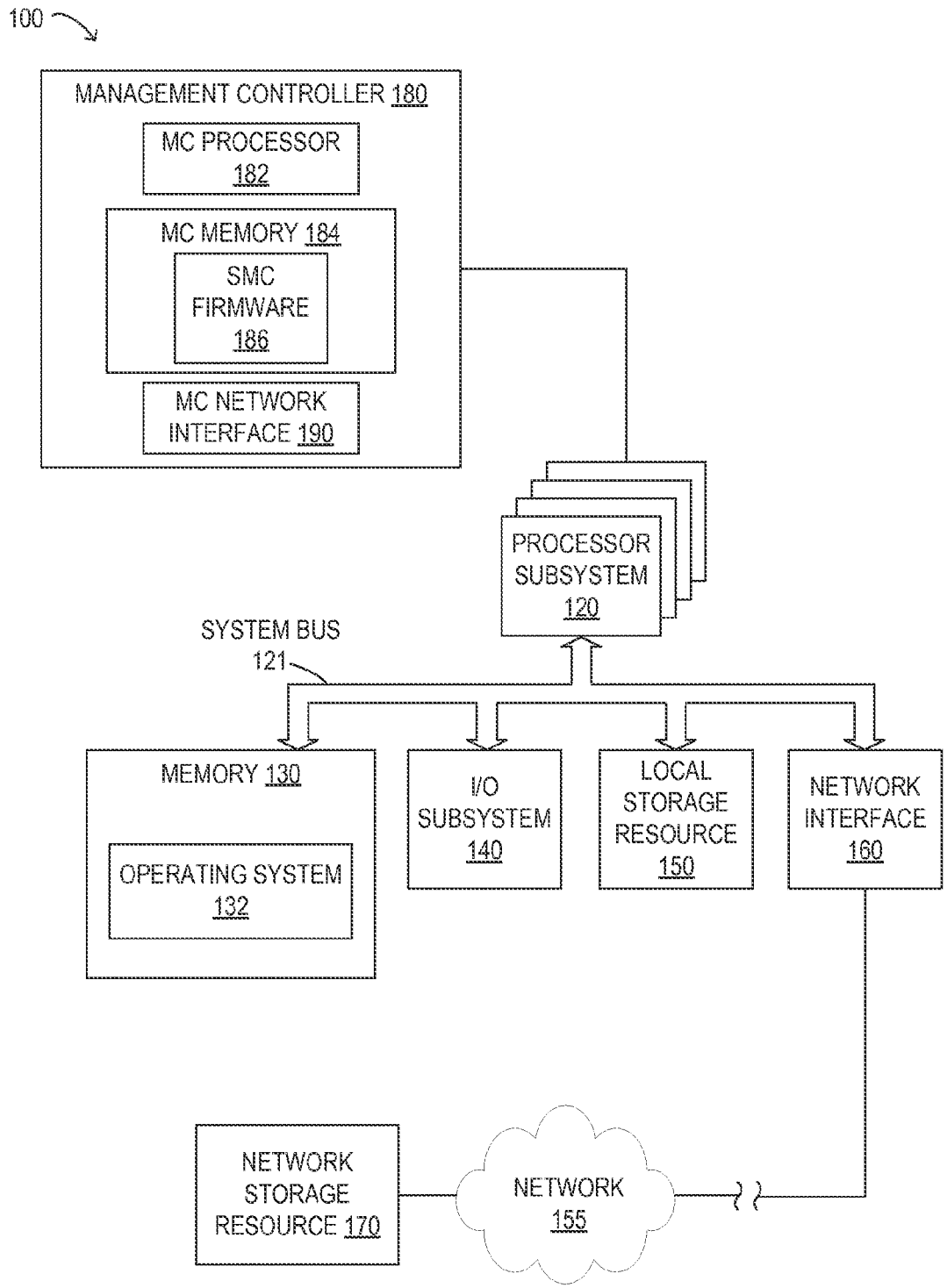
FIG. 1 is a block diagram of selected elements of an embodiment of an information handling system for service mode cooling of information handling resources.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-A" refers to an instance of a widget class, which may be referred to collectively as widgets "12" and any one of which may be referred to generically as a widget "12". In the figures and the description, like numerals are intended to represent like elements.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD), as well as communications media such wires, optical fibers, microwaves, radio waves, and other electromagnetic or optical carriers, or any combination of the foregoing.

Particular embodiments are best understood by reference to FIGS. 1-4, wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

In certain embodiments, information handling system 100 may be packaged within a computer chassis or enclosure, such as a server chassis holding one or more server blades in a rack domain, or a monolithic server. In some embodiments, information handling system 100 may include a storage enclosure, storage systems, switches, among other storage components. In some embodiments, information handling system 100 may be a personal computer or workstation (e.g., a desktop computer or a portable computer).

As shown in FIG. 1, components of information handling system 100 may include, but are not limited to, processor subsystem 120, which may comprise one or more processors, and system bus 121 that communicatively couples various system components to processor subsystem 120 including, for example, memory 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol or standard, including, but not limited to, transmission protocols and standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. Network 155 and its various components may be implemented using hardware, software, or any combination thereof. In certain embodiments, information handling system 100 or network 155 may be included in a rack domain.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource).

Also in FIG. 1, memory 130 may comprise a system, device, or apparatus operable to retain and retrieve program instructions and data for a period of time (e.g., computer-readable media). As shown in the example embodiment of FIG. 1, memory 130 stores operating system (OS) 132, which may represent instructions executable by processor subsystem 120 to operate information handling system 100 after booting. It is noted that in different embodiments, operating system 132 may be stored at network storage resource 170 and may be accessed by processor subsystem 120 via network 155 Memory 130 may comprise random access memory (RAM), electrically erasable programmable read-only memory (EEPROM), a PCMCIA card, flash memory, magnetic storage, opto-magnetic storage, and a suitable selection or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, or other type of rotating storage media, flash memory, EEPROM, or another type of solid state storage media) and may be generally operable to store instructions and data. For example, local storage resource 150 may store executable code in the form of program files that may be loaded into memory 130 for execution, such as operating system 132. In information handling system 100, I/O subsystem 140 may comprise a system, device, or apparatus generally operable to receive and transmit data from information handling system 100. I/O subsystem 140 may represent, for example, a variety of communication interfaces, graphics interfaces, video interfaces, user input interfaces, and peripheral interfaces. For example, I/O subsystem 140 may include a Peripheral Component Interconnect Express (PCI-E) interface that is supported by processor subsystem 120. In certain embodiments, I/O subsystem 140 may comprise a touch panel or a display adapter. The touch panel (not shown) may include circuitry for enabling touch functionality in conjunction with a display (not shown) that is driven by display adapter (not shown).

Also shown in FIG. 1 is management controller (MC) 180, which may include MC processor 182 as a second processor included with information handling system 100 for certain management tasks. MC processor 182 may have access to MC memory 184, which may store SMC firmware 186, representing instructions executable by MC processor 182 to implement service mode cooling, as described herein. In some embodiments, MC memory 184 may further store pre-boot instructions executable by MC processor 182, for example, for preparing information handling system 100 to boot by activating various hardware components in preparation of launching operating system 132 for execution (also referred to as a basic input/output system (BIOS)). In certain embodiments, MC memory 184 may store a Unified Extensible Firmware Interface (UEFI) according to a specification promulgated by the UEFI Forum (uefi.org). Also included with management controller 180 is MC network interface 190, which may be a secondary network interface to network interface 160. MC network interface 190 may provide 'out-of-'band' network access to management controller 180, for example, even when network interface 160 is unavailable. Thus, management controller 180 may execute MC firmware 186 on MC processor 182 and use MC network interface 190 even when other components in information handling system 100 are inoperable. It is noted that, in certain embodiments, management controller 180 may represent an instance of an Integrated Dell Remote Access Controller (iDRAC).

In operation, information handling system 100 may be subject to a power down sequence, such as a proper system shutdown, a loss of power to the information handling system, malfunction of components, among others. The power down sequence may result in particular information handling resources included with information handling system 100 being individually powered down. As described in further detail below, a first information handling resource may be identified as indicating service. For example, based on system error logs, such as recorded by OS 132, certain abnormalities with particular information handling resources may be identified and flagged as potentially indicating service. Additional information handling resources adjacent to the first information handling resource may also be identified as sharing a cooling zone that is cooled by one or more cooling elements. In various embodiments, the cooling elements may be any cooling device, such as a fan device, a cold-plate device, a thermo-electric device, a liquid cooling device, a heat transfer device, a Peltier cooling device, among others, that may be used within an information handling system. Then, a cooling element may be adjusted, for example, for an accelerated cooling of the first information handling resource or of the cooling zone associated therewith. Then as the first information handling resource is cooled, signals from sensors associated with the first information handling resource may be monitored to see if a predetermined policy has been satisfied, such as a safe service temperature being reached. Then, an alert may be output to the user using an indicator, signaling that the first information handling resource is safe to service, for example.

Figure 2:
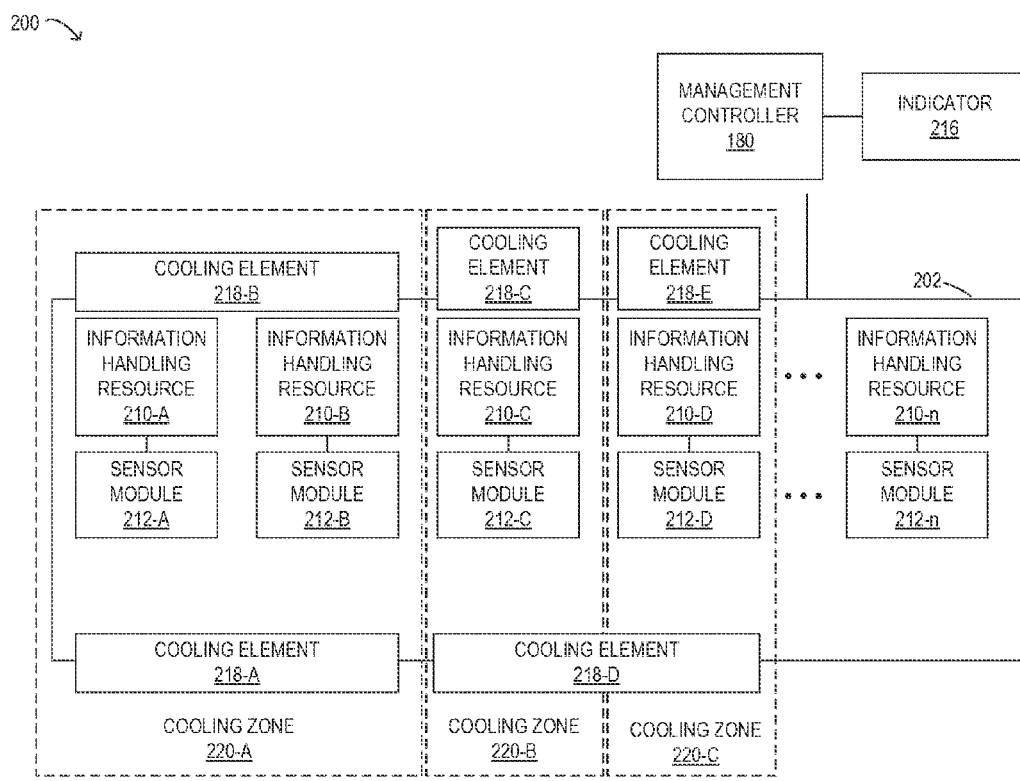
FIG. 2 is a block diagram of selected elements of a system for service mode cooling of information handling resources.

FIG. 2 illustrates an example system 200 for safe handling of information handling resources 210 of information handling system 100 in FIG. 1, in accordance with certain embodiments of the present disclosure. As shown in FIG. 2, system 200 is shown including n-number information handling resources, including 210-A, 210-B, 210-C, 210-D, and so on, up to information handling resource 210-*n* within an enclosure 202, which may be a chassis, a computer case, a rack enclosure, or other type of enclosure for information handling system 100. As noted previously, information handling resource 210 represents any of the components discussed with regard to information handling system 100 in FIG. 1. In FIG. 2, each information handling resource 210 may be associated with a corresponding sensor module 212, which may include any of a variety of sensors and associated circuitry, including temperature sensors. It is noted that in some embodiments, certain instances of information handling resource 210 may not have a corresponding sensor module 212 and may be limited to adjacent sensor modules 212 for measurement purposes. Also in FIG. 2, cooling elements 218 are shown assigned to respective cooling zones 220, as will be described in further detail. Management controller 180 is coupled to enclosure 202, information handling resources 210, sensor modules 212, and cooling elements 218 for monitoring and control purposes. Management controller 180 may further control indicator 216 to output an alert to the user.

Information handling resources 210 may broadly refer to any component system, device, or apparatus of information handling system 100, including without limitation, processors (e.g., processor subsystem 120), system bus 121, memory 130, as well as chipset components, audio cards, video cards, graphic cards, ambient inlet air ports, input-output devices and interfaces, storage resources, voltage regulators, network interfaces, motherboards, electro-mechanical devices, displays, power supplies, and other components. It is noted that the term "components" as used in this disclosure may refer to any combination of information handling resource(s) 210 of information handling system 100.

Sensor modules 212 may thermally monitor information handling resource(s) 210. In some embodiments, a specific sensor module 212 may be thermally coupled to a specific information handling resource 210 and may monitor the temperature of the information handling resource 210. Sensor modules 212 may also be thermally coupled to a plurality of information handling resources 210, in some embodiments. In other embodiments, one or more sensor modules 212 may be used to correlate the temperature of components that are not directly coupled to a sensor module 212. For example, controller 114 may determine an empirical correlation based on one or more sensors 112 to determine the temperature of components not directly coupled to a sensor 112.

Management controller 180 may use cooling zone mapping to identify the information handling resources 210 that are adjacent to the particular information handling resource(s) 210 that was identified as indicating service. A cooling zone mapping table, such as in Table 1 below, may be stored in MC memory 184 memory of management controller 180 or may be otherwise accessible to management controller 180 for determining the zone mapping.

TABLE 1

Cooling Zone Mapping Table for FIG. 2

|  | 218-A | 218-B | 218-C | 218-D | 218-E |
| --- | --- | --- | --- | --- | --- |
| IHR 210-A | zone 220-A | zone 220-A |  |  |  |
| IHR 210-B | zone 220-A | zone 220-A |  |  |  |
| IHR 210-C |  |  | zone 220-B | zone 220-B |  |
| IHR 210-D |  |  |  | zone 220-C | zone 220-C |

In Table 1 and as shown in FIG. 2, cooling zone 220A includes information handling resources 210-A and 210-B and cooling elements 218-A and 218-B; cooling zone 220-B includes information handling resource 210-C and cooling elements 218-C and 218-D; and cooling zone 220-C includes information handling resource 210-D and cooling elements 218-D and 218-E. Thus, cooling element 218-D may encompass two different cooling zones 220-B and 220-C. It is noted that Table 1 and FIG. 2 show an exemplary embodiment of cooling zones 220 and cooling zone mapping for descriptive purposes, and that different types and arrangements of cooling zone mapping may be used in various embodiments.

Each information handling resource 210 that shares a cooling zone 220 with the particular information handling resource 210 may be identified as an adjacent information handling resource 210. For example, when information handling resources 210-A and 210-B may be identified as adjacent information handling resources.

Management controller 180 may support any suitable protocol or standard including, for example, the Intelligent Platform Management Interface (IPMI) architecture, to communicate with sensor modules 212 and cooling elements 218 for monitoring and control purposes. In various embodiments, management controller 180 may use an I2C interface to communicate with sensor modules 212 or cooling elements 218. In some embodiments, management controller 180 may include, or be an integral part of, a baseboard management controller (BMC) and may determine a power down sequence for information handling system 100 and one or more of information handling resource(s) 210. Management controller 180 may accordingly receive signals from sensor modules 212 that include temperature information. Based at least on the received signals, management controller 180 may communicate alerts using, for example, indicator 216 to a user, such as a servicing technician, when any of the signals associated with sensor modules 212 vary from preset limits or thresholds. For example, in some embodiments, sensor modules 212 may thermally monitor information handling resource(s) 210, based on direct or indirect coupling. When a respective sensor module 212 indicates that a component is safe to handle (e.g., the temperature of the component is safe for handling or servicing by the user), management controller 180 may provide a notification through indicator 216, which may provide an audio or visual alert, such as outputting a message on a display of information handling system 100. Indicator 216 may be coupled to an auxiliary power source (not shown) that powers indicator 216, among other components, after a power down sequence is initiated.

In some embodiments, the actions of management controller 180 with regard to service mode cooling, as described herein, may be based on a user-provided policy, system configuration policy, or other predetermined policy that may allow custom power tailoring, acoustic (e.g., noise levels) considerations, and cool down times before the servicing of information handling resources 210 of information handling system 100. Management controller 180 may control cooling elements 218 coupled to information handling system 100, or throttle information handling resources 210 based on the predetermined policy, such as at the onset of the power down sequence. Cooling elements 218 may represent any cooling device, such as a fan device, a cold-plate device, a thermo-electric device, a liquid cooling device, a heat transfer device, and a Peltier cooling device, among others. In certain embodiments, cooling element(s) 218 may draw cool air from the outside, expel warm air from the components within enclosure 202 of information handling system 100, and move air across a heat sink to cool one or more particular components.

For example, when the predetermined policy indicates rapid cool down with little or no acoustic considerations (e.g., the noise level does not matter) to reduce or minimize downtime of information handling system 100, management controller 180 may operate cooling elements 218 at maximum cooling to quickly cool down information handling resources 210, or selected ones of information handling resources. While cooling elements 218 are in operation, management controller 180 may receive thermal information from one or more sensor modules 212 indicating the temperature of an associated information handling resource 210. When the thermal information indicates that the information handling resource 210 is safe to handle (e.g., safe to service, safe to swap out, safe to touch, etc.), management controller 180 may provide an audio or visual alert through indicator 216 to the user.

In some embodiments, management controller 180 may receive signals from sensor modules 212 thermally coupled to information handling resources 210 that are hot-swappable or removable devices such as, for example, blade module(s), I/O card(s) and module(s), processing unit(s), memory card(s) or module(s), hard disk drive(s) (HDD), and redundant power supply unit(s). When a sensor module 212 that is thermally coupled to a hot-swappable or removable device indicates that the temperature of the device is safe for removal, management controller 180 may provide a specific alert to a user through indicator 216, such as an alarm, messages displayed on a display, illumination of LEDs, other visual or audible alerts or various combinations thereof. For example, management controller 180 may determine when one or more temperatures for respective one or more of information handling resources 210 are within a predetermined temperature range, such as a temperature range deemed suitable for manual handling.

In some embodiments, management controller 180 may prevent access to and handling of information handling resources 210 until the resources have properly cooled down. An electro-mechanical cover may be placed over or around some or all components of information handling system 100. During the cooling of the information handling resources 210 using cooling elements 218, management controller 180 may keep the electro-mechanical cover locked, while signals indicating thermal properties of the covered information handling resources 210 are sent from sensor modules 212 to management controller 180. When the information handling resources 210 have cooled down or when a predetermined policy has been satisfied, management controller 180 may first indicate an audio or visual alert to a user via indicator 216. Management controller 180 may also "unlock" the cover allowing the user safe access to the information handling resources 210.

In operation, management controller 180 may access certain information provided by OS 132 with regard to information handling resource(s) 210, for example using MC network interface 190 or IPMI. Furthermore, upon manual power off, a user dialog box may be issued to obtain shutdown information from the user about the shutdown, such as a purpose of a servicing event. This shutdown information may be passed to and used by management controller 180 for service mode cooling operations, as described herein. Management controller 180 may further have access to system error logs, such as collected by OS 132 among other error logs. Based on the system error logs, management controller 180 may determine that a particular information handling resource 210 experienced an abnormality at some point prior to a power down sequence. Management controller 180 may identify the abnormality and the affected information handling resource 210, in order to apply methods for service mode cooling, as described herein.

Then, upon detection of a power down sequence by management controller 180, either initiated by a user or during a power interruption or power failure to information handling system 100, management controller 180 may control the cooling performance of cooling elements, such as by adjusting the speed of a cooling fan or the power of another type of cooling element. In some embodiments, management controller 180 may also reduce power to certain ones of information handling resources 210. In particular embodiments, management controller 180 may adjust the cooling of cooling elements 218 based on a predetermined policy such as, for example, a user-provided policy or a system configuration policy that may provide conditions that should be met prior to servicing or handling of information handling resources 210. For example, the predetermined policy may include a for cooling elements 218 that are fans based on acoustic levels (e.g., to minimize noise levels during the operation of the cooling fan), power demands (e.g., to minimize cooling element cooling to reduce power consumption), desired thermal properties for each information handling resource 210 (e.g., a safe temperature for handling and servicing information handling resources 210), among other criteria or conditions.

As cooling elements 218 operate, sensor modules 212 may send signals to management controller 180 indicating the temperature of one or more information handling resources 210. In some embodiments, sensor module 212 may send signals relating to the thermal properties of a corresponding information handling resource 210 directly coupled to sensor module 212. In the same or alternative embodiments, management controller 180 may determine the temperature of a component not directly coupled to any sensor modules 212, but rather, based on signals received from other sensor modules 212 surrounding the component. When the received signals from sensor modules 212 indicate that one or more information handling resources 210 are safe for handling, management controller 180 may provide an audible or visible alert to a user via indicator 216, as described previously.

Management controller 180 may also provide a report via, for example, a display or network interface 104 of information handling system 100. The report may summarize the events when the power down sequence for information handling system 100 or information handling resource 210 is detected, including events or measurements during and after the power down sequence. In some embodiments, the report may include, without limitation, the type of power down sequence (e.g., user initiated or power failure or interruption), the temperatures of one or more information handling resources 210 received from sensor modules 212, an indication whether the temperatures satisfy a predetermined policy, an indication whether one or more information handling resources 210 were serviced or handled prior to an alert being issued by management controller 180, the cooling level of cooling elements 218, the power consumption of cooling elements 218, the noise level of cooling elements 218, the ambient temperature, the temperature of information handling system 100, other system configurations, or various combinations thereof.

Figure 3:
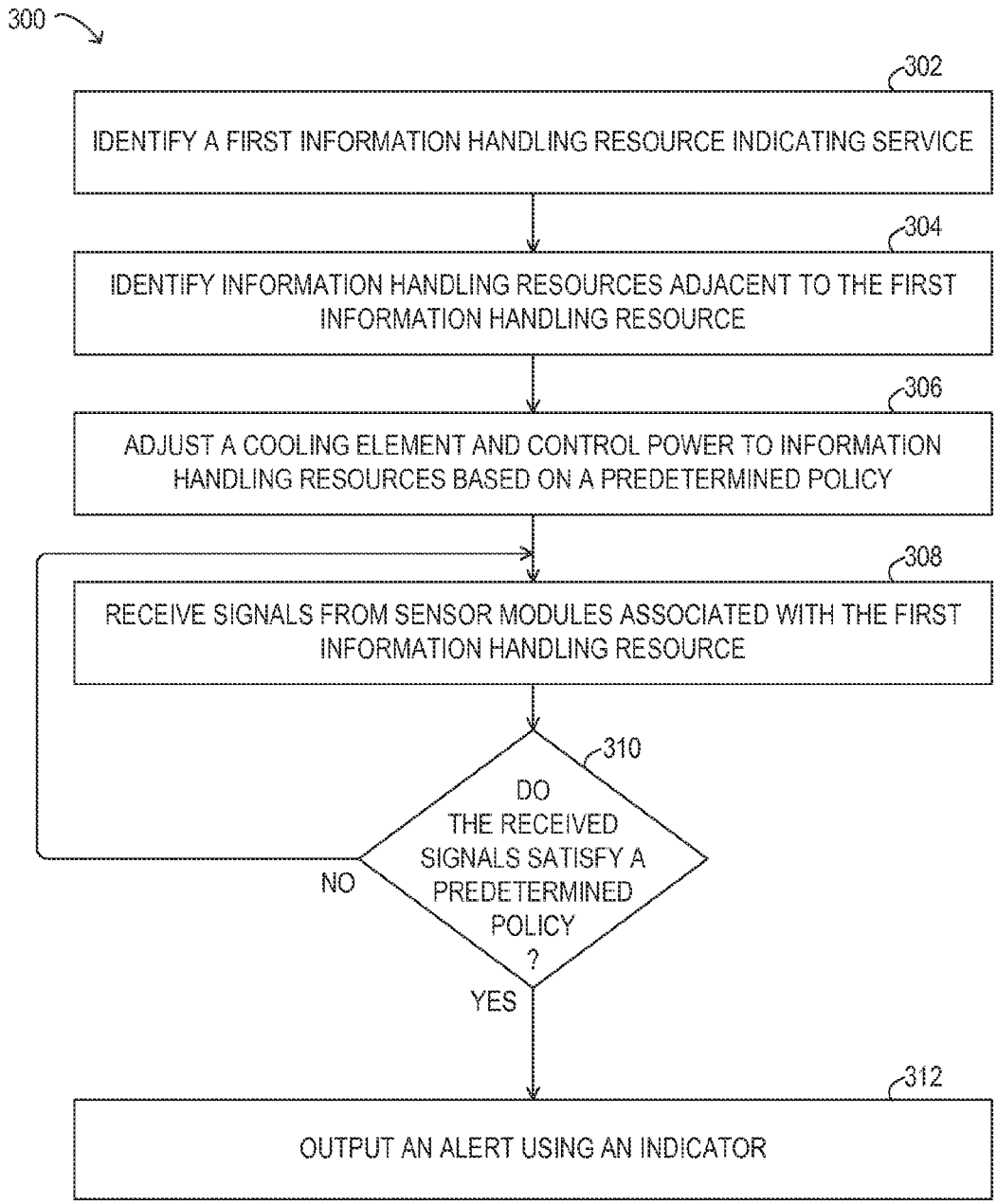
FIG. 3 is a flowchart depicting selected elements of an embodiment of a method for service mode cooling of information handling resources.

FIG. 3 illustrates a flow chart of an example method 300 for service mode cooling of information handling resources, in accordance with certain embodiments of the present disclosure. Method 300 may be performed using information handling system 100 (see FIG. 1), for example by using SMC firmware 186 by management controller 190. It is noted that certain operations described in method 300 may be optional or may be rearranged in different embodiments.

At step 302, a first information handling resource may be identified that indicates service. Additional details regarding the methods by which management controller 180 may identify the particular information handling resource(s) 210 that indicates service are discussed below in conjunction with method 400 in FIG. 4.

At step 304, the information handling resources that are adjacent to the first information handling resource may be identified. A user servicing the first information handling resource may come into contact with the adjacent information handling resources identified in step 304. At step 306, a cooling element may be adjusted and power to information handling resources may be controlled based on a predetermined policy. The first and adjacent information handling resources may have power controlled in step 306, while cooling elements 218 begin to cool down the first information handling resource.

In some embodiments, cooling elements 218 may be adjusted based on a predetermined policy in step 306, such as, for example, a user-provided policy or a system configuration policy. In each of the predetermined policies, a variety of different factors may be considered. For example, the predetermined policy may determine the operation of cooling elements 218 (e.g., a fan speed, power consumption, a noise level, and other operational factors for different kinds of cooling devices, respectively). In some embodiments, the predetermined policies may also define a desired time period in which information handling system 100 is offline or powered down, thus affecting the operation of cooling elements 218. For example, during a routine system maintenance or when replacing devices, the predetermined policies may determine that the cooling element should operate at maximum capacity (e.g., regardless of noise or acoustic consideration or power consumption) to properly and promptly cool down the components of information handling system 100 such that the service maintenance and replacement of components can be performed quickly and information handling system 100 may be restored to operation as soon as desired. The predetermined policies may also define a suitable handling temperature for some or all of the components of information handling system 100. The suitable handling temperature may be based on, for example, the type of components (e.g., DIMMS, chipsets, power supply units, hard drives, I/O cards or modules, etc.,) duration and type of handling (e.g., incidental or long-term handling including swapping out components), the type of materials touched (e.g., metal, plastic, glass, etc.), government and manufacturer standards and labels, the ambient temperature, the temperature of information handling system 100, the temperature of surrounding components, and various combinations thereof, among other factors.

At step 308, signals may be received from sensor modules associated with the first information handling resource. At step 308, while cooling elements 218 continue to cool down information handling resources 210 of information handling system 100, sensor modules 212 may send signals to management controller 180. The signals may indicate the temperature of the information handling resources 210 coupled directly or indirectly to sensor modules 212.

At step 310, a decision may be made whether the received signals satisfy a predetermined policy. At step 310, management controller 180 may determine when the signals received from sensor modules 212 satisfy the predetermined policy. For example, the predetermined policy may specify, based on the signals received from sensor modules 212, whether the temperature of a particular information handling resource 210 is safe for servicing and handling. When the predetermined policy is not satisfied and the result of step 310 is NO, method 300 may loop back to step 308, where management controller 180 may await updated signals sent from sensor modules 212. When the predetermined policy is satisfied and the result of step 310 is YES, method 300 may proceed to step 312 by outputting an alert using an indicator. At step 312, management controller 180 may provide an audible or visual alert to a user via indicator 216 indicating that the particular information handling resource 210 is safe for handling. In some embodiments, the alert may include an indication that other information handling resources are not safe for handling.

Figure 4:
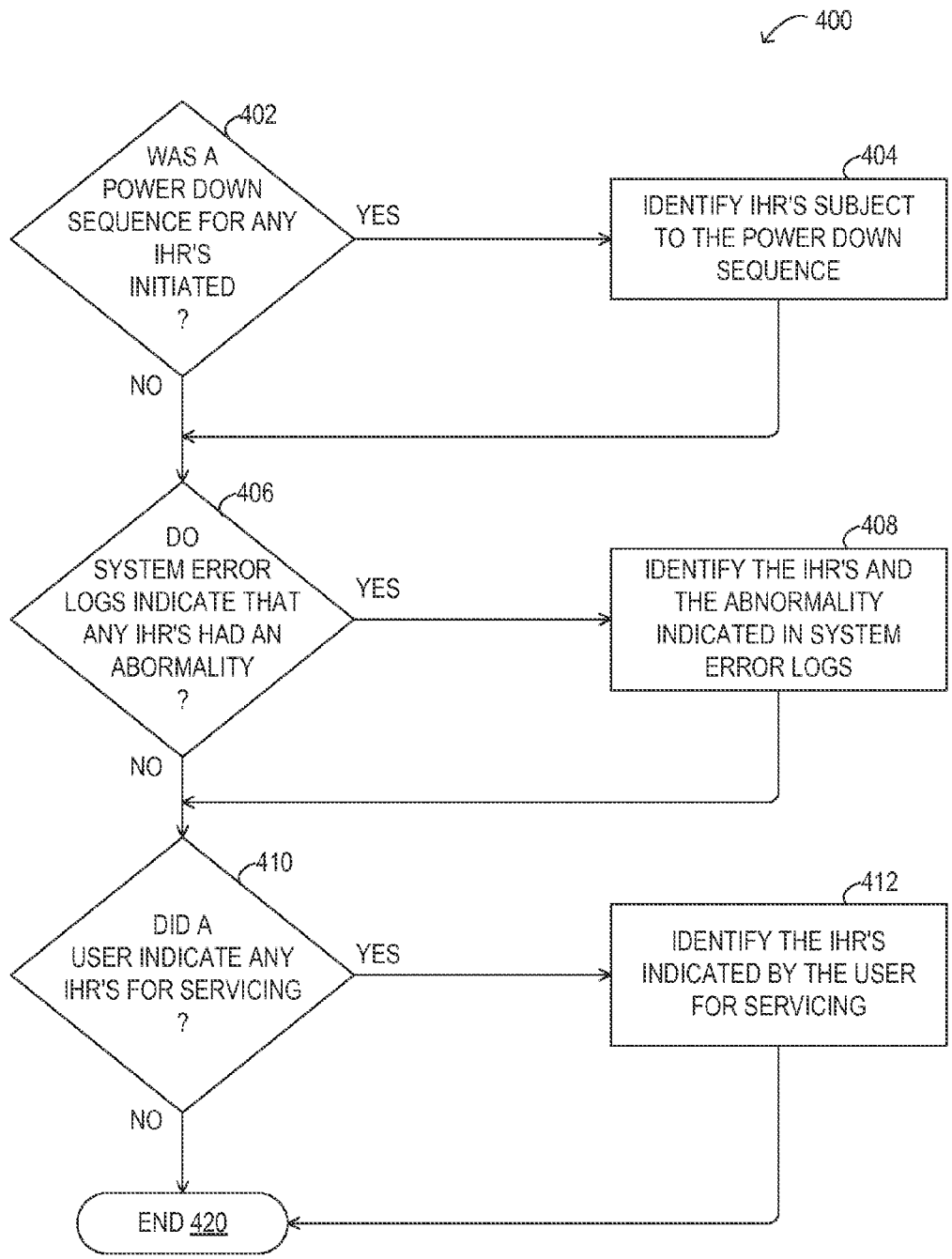
FIG. 4 is a flowchart depicting selected elements of an embodiment of a method for service mode cooling of information handling resources.

FIG. 4 illustrates a flow chart of an example method 400 for service mode cooling of information handling resources, in accordance with certain embodiments of the present disclosure. Method 400 may be performed using information handling system 100 (see FIG. 1), for example by using SMC firmware 186 by management controller 190. It is noted that certain operations described in method 400 may be optional or may be rearranged in different embodiments. In method 400, information handling resource(s) 210 that indicate service may be identified using different means.

Method 400 may begin at step 402. At step 402, a decision may be made whether a power down sequence for any information handling resources (IHR'S in FIG. 4) was initiated. At step 402, management controller 180 may determine whether a power down sequence has been initiated for any information handling resource 210 of information handling system 100. The power down sequence may be user initiated (e.g., software powering down sequence or hardware power down such as power button reset) or may be a power interruption or a power failure to the particular information handling resource 210 or information handling system 100. When a power down sequence has not been initiated for any information handling resource 210 of information handling system 100, the result of step 402 is NO and method 400 may proceed to step 406. When a power down sequence has been initiated for any information handling resource 210 of information handling system 100, the result of step 402 is YES and method 400 may proceed to step 404 by identifying information handling resources subject to the power down sequence. After step 404, method 400 may proceed to step 406.

At step 406, a decision may be made whether system error logs indicate that any information handling systems had an abnormality. At step 406, management controller 180 may determine whether system error logs indicate that any information handling resource 210 of information handling system 100 has experienced an error with a severity level that exceeds a predetermined threshold, which is identified as the abnormality. The system error logs may be acquired by an operating system of the information handling system. The predetermined threshold may be set by a user, such as a system administrator. When the system error logs do not indicate that any information handling resources had an abnormality, the result of step 406 is NO and method 400 may proceed to step 410. When the system error logs do indicate that any information handling resources had an abnormality, the result of step 406 is YES and method 400 may proceed to step 408 by identifying information handling resources and the abnormality indicated in the system error logs. After step 408, method 400 may proceed to step 410.

At step 410, a decision may be made whether a user indicated any information handling resources for servicing. At step 410, management controller 180 may determine whether user input has been received indicating that an information handling resource 210 of information handling system 100 has been selected by the user for service. When the user did indicate any information handling resources for servicing, the result of step 410 is YES and method 400 may proceed to step 412 by identifying information handling resources indicated by the user for servicing. When the user did not indicate any information handling resources for servicing, the result of step 410 is NO. After the result of step 410 is NO, or after step 412, method 400 may end at step 420.

Using the methods and systems disclosed herein, problems associated with conventional approaches to service mode cooling of information handling resources of an information handling system may be improved, reduced, or eliminated. For example, the methods and systems disclosed herein provide for controlling the cooling effects on the information handling resources, monitoring the thermal properties of the information handling resources, and alerting a user when one or more of the information handling resources are available for servicing and handling. In addition, certain embodiment provide user-provided policies or system configuration policies that establish servicing and handling guidelines that may be based on government guidelines, component guidelines, manufacturer guidelines, system guidelines, or other guidelines, warnings, or labels.

As disclosed herein, a management controller may monitor temperatures of information handling resources in an information handling system and identify abnormalities associated with the information handling resources. When a power down sequence is initiated, the management controller may use any identified abnormalities as well as user input indicating a particular information handling resource for service. The management controller may control cooling elements and perform service mode cooling to make the information handling system safe for servicing. The user may be alerted when the temperature conditions indicate safe handling of identified information handling resources. The management controller may also control an electromechanical cover preventing access to the information handling resources.

Although the present disclosure has been described in detail, it should be understood that various changes, substitutions, and alterations can be made hereto without departing from the spirit and the scope of the disclosure as defined by the appended claims.

What is claimed is:

1. A system for service mode cooling of information handling resources, the system comprising:
 an information handling system cooled by at least one cooling element, and further comprising:
 a plurality of information handling resources, including a first information handling resource, and a plurality of sensors thermally coupled to the plurality of information handling resources; and
 a controller communicatively coupled to the information handling system, wherein the controller is enabled to:
  determine when a power down sequence is initiated;
  access system error logs for the information handling system to determine whether the first information handling resource has experienced an abnormality;
  determine whether user input has been received from a user indicating that the first information handling resource has been selected for service;
  identify that the first information handling resource indicates service based on at least one of: a determination that a power down sequence has been initiated, a determination that system error logs for the information handling system indicate the first information handling resource has experienced an abnormality, and a determination that user input has been received from a user indicating that the first information handling resource has been selected for service;
  control operation of a cooling element to cool the first information handling resource;
  receive a first signal indicating a first temperature associated with the first information handling resource;
  determine when the first temperature is within a predetermined temperature range, the predetermined temperature range indicating safety for handling; and
  when the first temperature is within the predetermined temperature range, output an alert to a user indicating that the first information handling resource is safe for handling.

2. The system of claim 1, wherein the system error logs indicate an error having a severity level that exceeds a predetermined threshold.

3. The system of claim 1, wherein the alert comprises at least one of an audible alert and visual alert.

4. The system of claim 1, wherein the power down sequence is specific to the first information handling resource.

5. The system of claim 1, further comprising an electromechanical cover covering at least a portion of the information handling system, wherein the controller is further enabled to lock the electro-mechanical cover until the first temperature is within the predetermined temperature range.

6. The system of claim 1, wherein the controller comprises a management controller, and wherein the controller is further enabled to:
 based on a cooling zone within the information handling system associated with the first information handling resource, identify the cooling element.

7. The system of claim 1, further comprising a second information handling resource in the plurality of information handling resources, and wherein the controller is further enabled to:
 identify the second information handling resource as being adjacent to the first information handling resource;
 control operation of the cooling element to cool the first information handling resource and the second information handling resource;
 receive a second signal indicating a second temperature associated with the second information handling resource; and
 output the alert to the user indicating that the first information handling resource is safe for handling based on the first temperature and the second temperature.

8. An information handling system, comprising:
 a plurality of information handling resources, including a first information handling resource and a second information handling resource, including a plurality of sensors thermally coupled to the plurality of information handling resources; and
 a controller communicatively coupled to the plurality of information handling resources and enabled to:
  identify that the first information handling resource indicates service based on at least one of: initiation of a power down sequence, system error logs for the information handling system, and user input from a user;
  identify the second information handling resource as being adjacent to the first information handling resource;
  control operation of a cooling element to cool the first information handling resource and the second information handling resource;
  receive a signal indicating a first temperature associated with the first information handling resource and a second temperature associated with the second information handling resource;
  determine when the first temperature and the second temperature are within a predetermined temperature range, the predetermined temperature range indicating safety for handling; and
  when the first temperature and the second temperature are within the predetermined temperature range, output an alert to a user indicating that the first information handling resource is safe for handling.

9. The information handling system of claim 8, wherein the system error logs indicate an error having a severity level that exceeds a predetermined threshold.

10. The information handling system of claim 8, wherein the controller comprises a management controller, and wherein the controller is further enabled to:
    based on a cooling zone within the information handling system associated with the first information handling resource, identify the cooling element.

11. The information handling system of claim 8, wherein the cooling element includes a cooling fan, and wherein controlling operation of the cooling element comprises controlling at least one of a fan speed and a power consumption of the cooling element.

12. The information handling system of claim 8, wherein the power down sequence is specific to the first information handling resource.

13. The information handling system of claim 8, wherein the controller is further enabled to report configuration parameters of the information handling system when a power down sequence is detected.

14. The information handling system of claim 8, wherein the plurality of information handling resources comprise at least one of a processor and a memory device.

15. The information handling system of claim 8, wherein the alert comprises at least one of an audible alert and a visual alert.

16. A method for service mode cooling of information handling resources, the method comprising:
    determining whether a power down sequence has been initiated;
    accessing system error logs for the information handling system to determine whether a first information handling resource has experienced an abnormality;
    determining whether user input has been received from a user indicating that the first information handling resource has been selected for service;
    identifying that the first information handling resource of a plurality of information handling resources indicates service based on at least one of: a determination that a power down sequence has been initiated, a determination that system error logs for the information handling system indicate the first information handling resource has experienced an abnormality, and a determination that user input has been received from a user indicating that the first information handling resource has been selected for service, wherein the plurality of information handling resources include a plurality of sensors thermally coupled to the plurality of information handling resources;
    based on a cooling zone within the information handling system associated with the first information handling resource, identifying a cooling element enabled to cool the first information handling resource;
    controlling operation of the cooling element to cool the first information handling resource;
    receiving a first signal indicating a first temperature associated with the first information handling resource;
    determining when the first temperature is within a predetermined temperature range, the predetermined temperature range indicating safety for handling; and
    when the first temperature is within the predetermined temperature range, outputting an alert to a user indicating that the first information handling resource is safe for handling.

17. The method of claim 16, wherein the system error logs indicate an error having a severity level that exceeds a predetermined threshold.

18. The method of claim 16, wherein controlling operation of the cooling element comprises controlling a cooling level of the cooling element.

19. The method of claim 16, wherein the system error logs are collected by an operating system executing on the information handling system, and further comprising:
    accessing the system error logs by a management controller included in the information handling system.

20. The method of claim 16, further comprising:
    identifying a second information handling resource of the plurality of information handling resources as being adjacent to the first information handing resource;
    controlling operation of the cooling element to cool the first information handling resource and the second information handling resource;
    receiving a second signal indicating a second temperature associated with the second information handling resource; and
    outputting the alert to the user indicating that the first information handling resource is safe for handling based on the first temperature and the second temperature.

* * * * *